(12) United States Patent
Lohmüller et al.

(10) Patent No.: US 6,497,620 B1
(45) Date of Patent: Dec. 24, 2002

(54) COUPLING ASSEMBLY FOR AGRICULTURAL IMPLEMENTS

(75) Inventors: Andreas Lohmüller, Bonn (DE); Andreas Sarfert, Bonn (DE); Reinhold Walter, Lohmar (DE); Eberhard Wilks, Daufenbach (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/658,098

(22) Filed: Sep. 8, 2000

(30) Foreign Application Priority Data

Sep. 9, 1999 (DE) .......................... 199 43 209

(51) Int. Cl.$^7$ .......................... F16D 27/00; F16D 13/36
(52) U.S. Cl. .............................. 464/29; 464/2; 464/45; 464/48; 192/84.91
(58) Field of Search ................. 192/90, 84.91; 464/29, 1, 2, 23, 45, 46, 47, 48, 99, 901

(56) References Cited

U.S. PATENT DOCUMENTS

| | | | |
|---|---|---|---|
| 2,209,776 A | | 7/1940 | Kiekhaefer |
| 2,214,901 A | * | 9/1940 | Griffin .......................... 192/90 |
| 2,983,339 A | * | 5/1961 | Neff ............................. 192/90 |
| 3,028,737 A | * | 4/1962 | Rudisch ........................ 192/90 |
| 3,315,773 A | * | 4/1967 | Aschauer ...................... 192/90 |
| 3,613,849 A | * | 10/1971 | Pape ............................ 192/90 |
| 3,983,971 A | * | 10/1976 | Kawai .......................... 192/90 |
| 4,189,042 A | * | 2/1980 | Miller .......................... 192/90 |
| 4,376,476 A | | 3/1983 | Hagiri |
| 4,662,499 A | * | 5/1987 | Jordan ......................... 192/90 |
| 4,718,525 A | | 1/1988 | Yamaguchi |
| 4,896,754 A | * | 1/1990 | Carlson et al. .............. 192/21.5 |
| 4,982,825 A | | 1/1991 | Sekella |
| 5,030,942 A | | 7/1991 | Langen et al. |
| 5,291,977 A | * | 3/1994 | Sommer ....................... 192/90 |
| 5,323,888 A | * | 6/1994 | Sommer ....................... 192/90 |
| 5,433,297 A | * | 7/1995 | Kuivamaki ................. 188/71.8 |
| 5,613,588 A | | 3/1997 | Vu |
| 6,009,989 A | * | 1/2000 | Boffelli et al. ................ 192/90 |

FOREIGN PATENT DOCUMENTS

| | | |
|---|---|---|
| DE | 35 40 719 A1 | 6/1986 |
| DE | 3601708 A1 | 7/1987 |
| DE | 3801348 C2 | 10/1990 |
| DE | 3906050 C2 | 5/1991 |
| DE | 19535970 A1 | 7/1996 |
| GB | 908918 | 10/1962 |
| GB | 973229 | 10/1964 |
| GB | 1133671 | 11/1968 |
| GB | 2138893 | 10/1984 |
| GB | 2 164 408 A | 3/1986 |

* cited by examiner

*Primary Examiner*—Lynne H. Browne
*Assistant Examiner*—Kenn Thompson
(74) *Attorney, Agent, or Firm*—Harness, Dickey & Pierce, P.L.C.

(57) ABSTRACT

A coupling assembly for agricultural implements has a friction coupling (1), an electromagnet (6) and control mechanism (7). The friction coupling (1) includes a friction assembly (4) which is loaded by a pressure plate (14). The pressure plate (14) is loaded by pressure springs (15, 16). The pressure plate (14) is adjustable by an actuating device (5) which includes an electromagnet (6) and an anchor plate (19). The control mechanism (7) includes a control member (27) which, by changing the electric current, regulates the pressure force of the pressure plate (14) during the coupling and/or uncoupling operation. The housing (2) and the hub (3) are associated with speed sensors (25, 26) which transmit a signal to the control mechanism (7) to relieve the load on the friction assembly. Thus, this prevents the friction coupling (1) from overheating.

8 Claims, 2 Drawing Sheets

COUPLING ASSEMBLY FOR AGRICULTURAL IMPLEMENTS

CROSS-REFERENCE TO RELATED APPLICATIONS

This application is based upon and claims priority to German Patent Application 199 43 209.0 filed Sep. 9, 1999, which application is herein expressly incorporated by reference.

BACKGROUND OF THE INVENTION

The invention relates to a coupling assembly for agricultural implements which includes a friction coupling.

Friction couplings are used in agricultural machinery when large masses, such as flywheels, need to be accelerated. During acceleration, the coupling slips and transforms the absorbed energy into heat. The friction coupling in such implements also reacts if a blockage occurs inside the implement. Thus, the entire friction power, or the driving power, is transformed into heat. The coupling heats up very quickly. The stored heat can only be dissipated via the coupling surface. In consequence, cooling takes a correspondingly long time. Accordingly, a great risk of the friction coupling overheating exists. This is the reason why friction couplings are used only in those cases where large masses need to be accelerated and where overloading due to blockages occurs only occasionally.

SUMMARY OF THE INVENTION

It is an object of the invention to provide a coupling assembly with a friction coupling where the risk of overheating is reduced. In consequence, the coupling has a correspondingly longer service life.

In accordance with the invention, a coupling assembly has a friction coupling which defines a longitudinal axis. The friction coupling has a housing with a first friction face positioned perpendicularly to the longitudinal axis. A hub is received in the housing. The hub is rotatable relative to the housing around the longitudinal axis. The hub is axially displaceable to a limited extent. The hub includes at least one first hub plate which is firmly connected to the hub. A pressure plate, with pressure springs, loading the pressure plate, is supported on a supporting plate secured to the housing. Friction plates are arranged between the first friction face of the housing and the first hub plate. Also, friction plates are positioned between the first hub plate and the pressure plate. Optionally, friction plates are positioned between each further plate connected to the housing and each further plate connected to the hub. An actuating device with an annular electromagnet is arranged co-axially around a portion of the hub projecting from the housing. The actuating device is rotatable relative thereto and non-adjustably supported in the direction of the longitudinal axis and securable against rotation by securing means. The actuating device includes an anchor plate which is connected by setting pins to the pressure plate. Also, the actuating device is connected to the housing in a rotationally fast way. A control mechanism is present to connect the electromagnet to a power source.

An advantage of this assembly is that, during acceleration, the transmitted torque slowly builds up to the nominal torque. Thus, a high speed differential exists. The specific surface pressure values at the beginning of the coupling process are low. Accordingly, compared to conventional solutions, less heat is generated which need to be absorbed by the coupling. Thus, the risk of the coupling overheating is reduced and the service life is increased.

A method of controlling a friction coupling exists to achieve the objective. The friction coupling includes a housing, a hub and a friction assembly loaded by a pressure plate. The pressure plate is loaded by pressure springs. The pressure plate is adjustable by an actuating device. Adjustment takes place by a control mechanism such that, within a predetermined period of time, the pressure force of the pressure plate, while starting from a minimum value, is increased to the full value of pressure application. The smallest possible minimum value is zero.

According to a further embodiment of the invention, apertures extending parallel to the longitudinal axis are formed on the circumference of the supporting plate. Setting pins are guided through each of the apertures. In the region between the pressure plate and the supporting plate, the pressure springs are received on the setting pins. Accordingly, the anchor plate is guided by the setting pins in an advantageous way. The electromagnet is preferably supported by rolling contact bearings.

The control mechanism preferably includes a control member. While the friction coupling starts to operate, the control member causes the actuating force generated by the electromagnet, acting against the force of the pressure springs, to drop from a maximum to a reduced value over a predetermined period of time. When the electromagnet no longer applies any force to the pressure plate in the load-relieving sense, the coupling is set to the nominal torque.

Additionally, a claw coupling is provided for applications requiring the operation of uncoupling the driveline to proceed over a long period of time. The claw coupling is connected in series relative to the friction coupling and to the actuating device. The claw coupling interrupts the flow of force in an energy-free way. For a lengthy disconnecting operation, the power consumption of the electromagnet would be too high.

The housing and the hub are each associated with a speed sensor to prevent the friction coupling from overheating in the case of overloading. The control mechanism includes a speed comparator and a time member. If a predetermined speed differential between the housing and the hub is exceeded, the control mechanism activates the electromagnet for a predetermined period of time to at least partially relieve the load on the friction assembly. A warning signal indicates to the operator that overloading is taking place. Thus, the signal enables the operator to stop the machine and to remove any blockages which may have resulted in overloading.

During activation of the electromagnet, to prevent the anchor plate from hitting the electromagnet and to prevent the setting pins from being bent at start up of the coupling, the anchor plate is connected to the supporting plate by fixing elements. Thus, the anchor plate is axially displaceable to a limited extent and rotationally fast.

According to a further embodiment of the inventive method, it is proposed to increase the pressure force for a predetermined time period in order to act against a reduction in the friction value when the coupling is used frequently. Also, the implement is freed in the case of a blockage. Accordingly, a second electromagnet or an additional coil are included to provide the anchor plate with additional pressure.

Furthermore, to achieve disconnection in the event of overloading, the speeds of the housing and of the hub are measured and compared. If a predetermined speed differential is exceeded over a predetermined period of time, the load on the friction assembly is relieved and a warning signal is generated.

Accordingly, the coupling assembly and method of operation with a controlled starting behavior enable the design of the drivelines connected to and following the coupling assembly to take place without taking into account the starting peaks. Even when the coupling is warm, it is possible to provide compensation during the starting process. Here, increased pressure is applied to the friction coupling. As a result, the transmission of torque by the coupling can be increased to such an extent that it corresponds to the normal starting behavior of the coupling, beginning with the cold condition.

From the following detailed description, taken in conjunction with the drawings and subjoined claims, other objects and advantages of the present invention will become apparent to those skilled in the art.

BRIEF DESCRIPTION OF THE DRAWINGS

Two preferred embodiments of the invention are diagrammatically illustrated in the drawing wherein.

DETAILED DESCRIPTION OF THE PREFERRED EMBODIMENT

Figure 1:
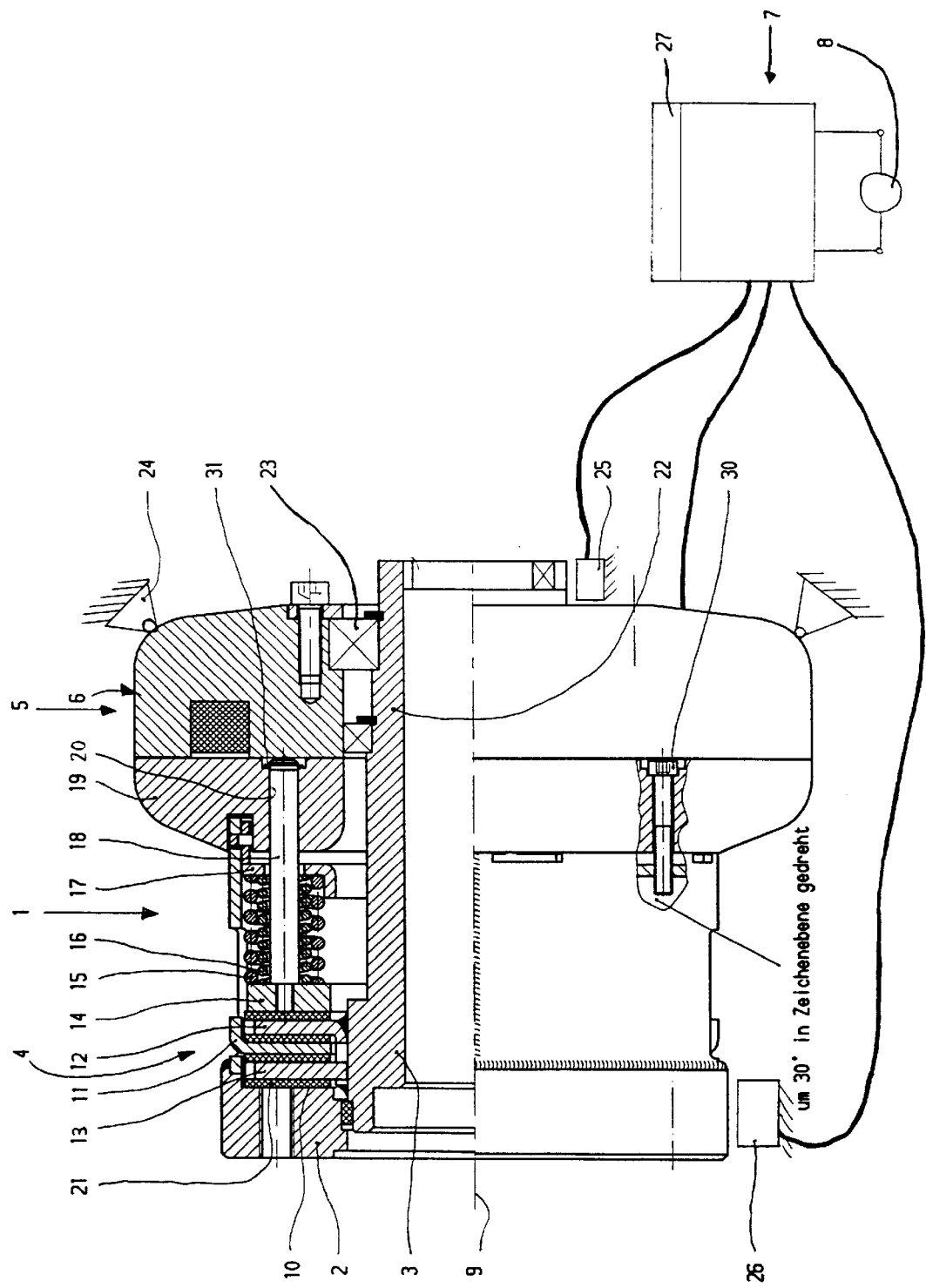
FIG. 1 shows a first embodiment of a coupling assembly with a friction coupling and an electromagnet in half a longitudinal section.

FIG. 1 illustrates a friction coupling 1 which is actuated electromagnetically. The coupling 1 includes a housing 2, a hub 3, a friction assembly 4, an actuating device 5 with an electromagnet 6, and an anchor plate 19. The electromagnet 6 can be connected to a power source 8 by a control mechanism 7.

The housing 2 is arranged and centered on a longitudinal axis 9. The housing has a first friction face 10 arranged perpendicularly relative to the longitudinal axis 9. A housing plate 11 is connected to the housing 2. The housing plate 11 is rotationally fast relative to the longitudinal axis 9 and is axially adjustable along the longitudinal axis 9.

The hub 3 is received in the housing 2 and centered on the longitudinal axis 9. The hub is rotatable relative to the housing 2 around the longitudinal axis 9. A first hub plate 12 is connected to the hub 3. The first hub plate 12 is rotationally fast and axially non-displaceable. A second hub plate 13 is connected to the hub 3. The second hub plate 13 is rotationally fast relative to the longitudinal axis 9 and axially displaceable along the longitudinal axis 9.

A pressure plate 14 adjoins the first hub plate 12. The pressure plate 14 is loaded by pressure springs 15, 16. The pressure springs 15, 16 are supported on a supporting plate 17 connected to the housing 2. The supporting plate 17 is held by a cylindrical sleeve in the open end of the housing. The sleeve is held by, for example, portions pressed into circumferentially extending openings in the housing 2. Setting pins 18 extend through the centers of the springs 15, 16. Both the setting pins and springs are arranged parallel to the longitudinal axis 9.

The setting pins 18 are axially fixed to the pressure plate 14. The setting pins 18 extend into apertures 20 in an annular anchor plate 19. The setting pins 18 are fixed to the annular anchor plate 19 by means of securing rings 31.

On its circumference, the supporting plate 17 includes circumferentially spaced clearance apertures which extend parallel to the longitudinal axis 9. The setting pins 18 extend through the respective clearance apertures in the supporting plate 17.

Friction plates are positioned between the first friction face 10 of the housing 2 and the second hub plate 13; between the second hub plate 13 and the housing plate 11; between the housing plate 11 and the first hub plate 12; and between the first hub plate 12 and the pressure plate 14.

The anchor plate 19 adjoins the electromagnet 6. Fixing elements 30 connect the anchor plate 19 to the supporting plate 17 of the housing 2 in an axially displaceable, to a limited extent, and rotationally fast way. Even if wear occurs at the friction plates 21, contact does not occur between the anchor plate 19 and the electromagnet 6. Furthermore, the fixing elements 30 prevent the setting pins 18 from being bent when the friction coupling 1 starts operating. The fixing element 30 shown in the drawing has been displaced through 30° about the axis 9 in order to appear in the plane of the drawing.

The electromagnet 6 is annular in shape. The electromagnet 6 is arranged co-axially around a portion 22 of the hub 3 which projects from the housing 2. The electromagnet 6 is rotatable relative to the hub 3. The electromagnet 6 is supported by a rolling contact bearing 23 and is non-axially adjustable along the longitudinal axis 9. Securing mechanism 24 prevents the electromagnet 6 from rotating when the friction coupling 1 starts operating.

The hub 3 and the housing 2 are each associated with a speed sensor 25, 26. The speed sensors 25, 26 measure the speed per unit of time of the respective component. The first speed sensor 25, the second speed sensor 26 and the electromagnet 6 are connected to the control mechanism 7. The data measured by the speed sensors 25, 26 serve as input signals to control the electromagnet 6.

As a result of the controlling electromagnet 6, the torque transmitted during acceleration of the driveline can slowly be built up to the required nominal torque. If, at the start of the coupling operation, a high speed differential exists between the hub 3 and the housing 2, the specific surface pressure values existing between the housing plate 11 and the hub plates 12, 13 and the friction plates 21 can be minimized. As a result, the generated heat, which needs to be absorbed by the friction coupling 1, can also be minimized. The risk of overheating is reduced and the service life of the friction coupling 1 is increased.

If a predetermined speed differential is exceeded between the housing 2 and the hub 3 for a predetermined time period, the speed sensors 25, 26 activate the electromagnet 6, via the control mechanism 7, to relieve the load on the friction assembly 4. A warning signal indicates to the operator that overloading has occurred. Thus, the machine can be stopped and any blockages which may have caused the overloading can be removed.

The control mechanism 7 includes a control member 27. The control member 27, when the friction coupling 1 starts operating, causes the actuating force generated by the electromagnet 6 and acting against the force of the pressure springs 15, 16 to drop from a maximum to zero during a predetermined period of time. If the electromagnet 6 no longer applies a force to the pressure plate 14 in a load relieving sense, then the friction coupling 1 is set to the required nominal torque.

In case the pressure plate 14 is to be additionally loaded, a second electromagnet or an additional coil are provided.

The second electromagnet or coil are arranged co-axially relative to the first electromagnet 6. It may be arranged to act on the anchor plate 19 in the opposite sense to the electromagnet 6. As a result, a brief increase in torque is achieved. A blocked implement can thus be freed. Also, it is possible to compensate for a reduction in torque which occurs when the friction coupling 1 is heated due to a decreasing friction value between the housing plate 11 and the hub plates 12, 13 and the friction plates 21.

Figure 2:
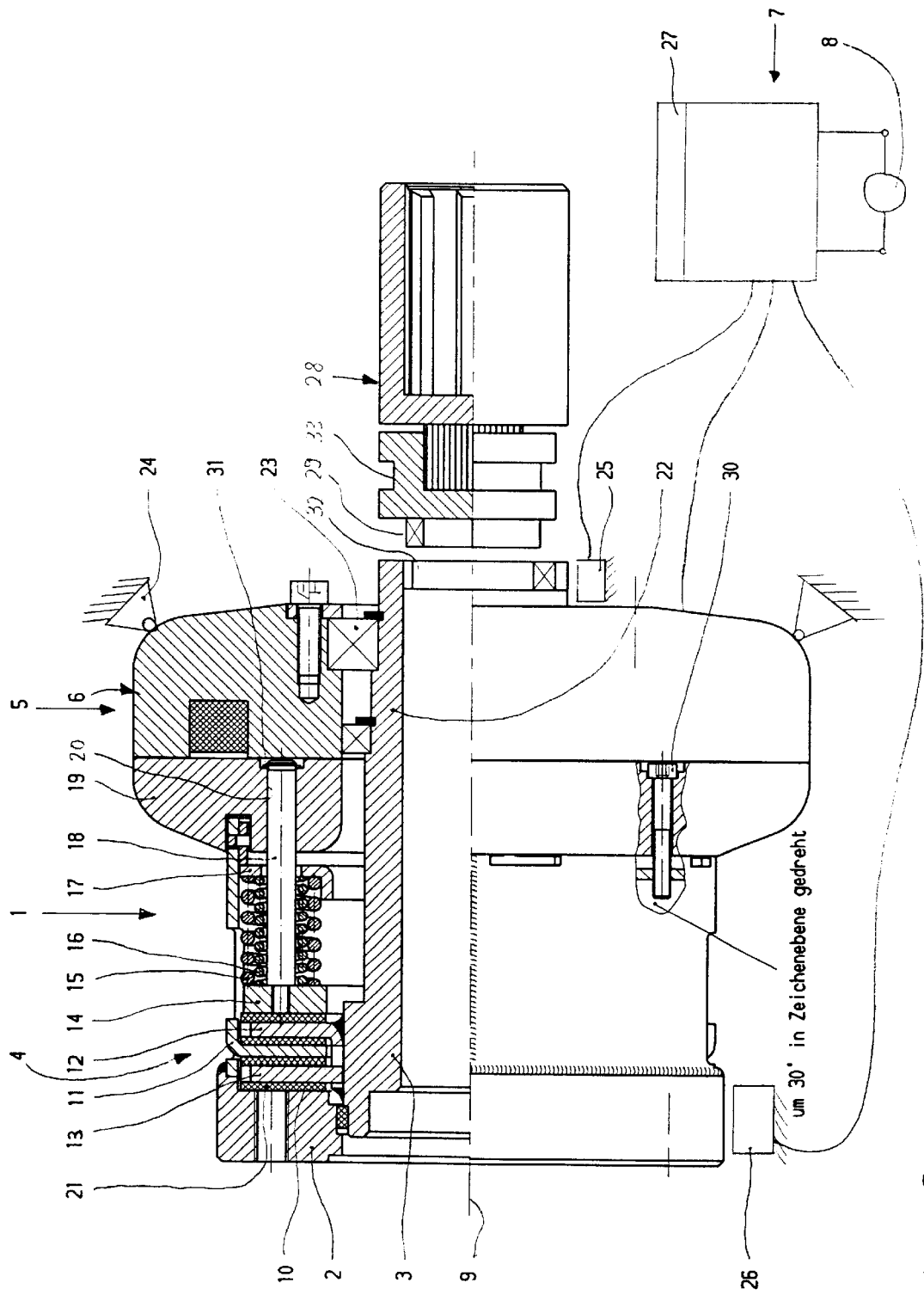
FIG. 2 shows a second embodiment wherein, in addition to the friction coupling, a claw coupling is connected in series.

FIG. 2 shows an embodiment where, in addition to the friction coupling 1 with the control mechanism 7, a claw coupling 28 is provided. The claw coupling 28 is connected in series relative to the friction coupling 1. A purely electromagnetically actuated friction coupling 1, even when uncoupling the driveline, requires electric current to the electromagnet 6. The claw coupling 28 achieves an energy-free interruption in the power flow if the driveline has to be disconnected over a long period of time. The claw coupling 28 is arranged and centered on the longitudinal axis 9. The claw coupling 28 includes a claw 29 which engages a corresponding recess 32 in the hub 3 when the agricultural implement is in operation. If disconnection is to take place, the claw 29 of the claw coupling 28 is pulled out of the hub 3 by a switching yoke. The switching yoke can be made to engage a corresponding recess 33 of the claw coupling 28, so that the power flow is interrupted.

While the above detailed description describes the preferred embodiment of the present invention, the invention is susceptible to modification, variation and alteration without deviating from the scope and fair meaning of the subjoined claims.

What is claimed is:

1. A coupling assembly for rotatingly driving agricultural implements and for rotatingly driven drive portions in agricultural implements, comprising:

a friction coupling defining a longitudinal axis, said coupling having a housing, a first friction face positioned perpendicularly to the longitudinal axis;

a hub received in the housing, said hub being rotatable relative to said housing around said longitudinal axis, said hub being axially displaceable to a limited extent;

at least one first hub plate firmly connected to the hub, a pressure plate, pressure springs loading the pressure plate, said pressure springs supported on a supporting plate secured to the housing, friction plates being arranged between the first friction face of the housing and the first hub plate, between the first hub plate and the pressure plate and optionally between each further plate connected to the housing and each further plate connected to the hub;

an actuating device including an annular electromagnet arranged coaxially around a portion of the hub projecting from the housing, said annular electromagnet being rotatable relative to said hub and non-axially adjustably supported along the longitudinal axis, said electromagnet securable against rotation by a securing mechanism, said actuating device including anchor plate connected by setting pins to the pressure plate and connected to the housing in a rotationally fast way; and control mechanism for connecting the electromagnet to a power source.

2. A coupling assembly according to claim 1, wherein the supporting plate includes apertures on its circumference, said apertures extending parallel to the longitudinal axis and the setting pins are guided through each aperture and between the pressure plate and the supporting plate the pressure springs are received on the setting pins.

3. A coupling assembly according to claim 1, wherein the electromagnet is supported by a rolling contact bearing on the portion of the hub projecting from the housing.

4. A coupling assembly according to claim 1, wherein the control mechanism comprises a control member which, during start-up of the friction coupling causes the actuating force generated by the electromagnet and acting against the force of the pressure springs to drop from a maximum to a reduced value over a predetermined time period.

5. A coupling assembly according to claim 1, wherein a claw coupling being connectable in series relative to the friction coupling and the actuating device.

6. A coupling assembly according to claim 1, wherein the housing and the hub are each associated with a speed sensor and said control mechanism includes a comparator and a time member which, if a predetermined speed differential between the housing and the hub is exceeded, said control mechanism activates the electromagnet for a predetermined time period to at least partially relieve the load on the friction assembly.

7. A coupling assembly according to claim 1, wherein fixing elements connecting the anchor plate to the supporting plate in a limited axially displaceable and rotationally fast way.

8. A coupling assembly according to claim 1, further comprising a second annular electromagnet arranged co-axially around the portion of the hub projecting from the housing, said second annular electromagnet being rotatable relative thereto and non-axially adjustably supported along the longitudinal axis and said second annular electromagnet securable against rotation by a securing mechanism, said second annular electromagnet being activated in the sense of increasing the pressure force on the friction assembly.

* * * * *

UNITED STATES PATENT AND TRADEMARK OFFICE
CERTIFICATE OF CORRECTION

PATENT NO.    : 6,497,620 B1
DATED         : December 24, 2002
INVENTOR(S)   : Andreas Lohmuller et al.

It is certified that error appears in the above-identified patent and that said Letters Patent is hereby corrected as shown below:

<u>Column 6,</u>
Line 7, after "including" insert -- an --.

Signed and Sealed this

Twelfth Day of August, 2003

JAMES E. ROGAN
*Director of the United States Patent and Trademark Office*